March 30, 1926.  1,579,108
C. J. HARTER
APPARATUS FOR TESTING THE ACCURACY OF GEAR TEETH CUTTERS
Filed Sept. 20, 1921  3 Sheets-Sheet 1

INVENTOR
Clarence J. Harter
BY
Howard P. Denison
ATTORNEY

March 30, 1926.
C. J. HARTER
1,579,108
APPARATUS FOR TESTING THE ACCURACY OF GEAR TEETH CUTTERS
Filed Sept. 20, 1921    3 Sheets-Sheet 2
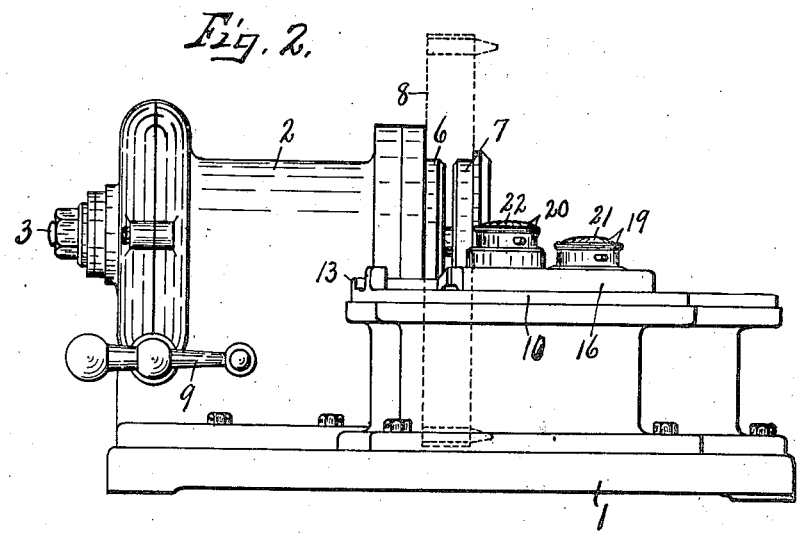
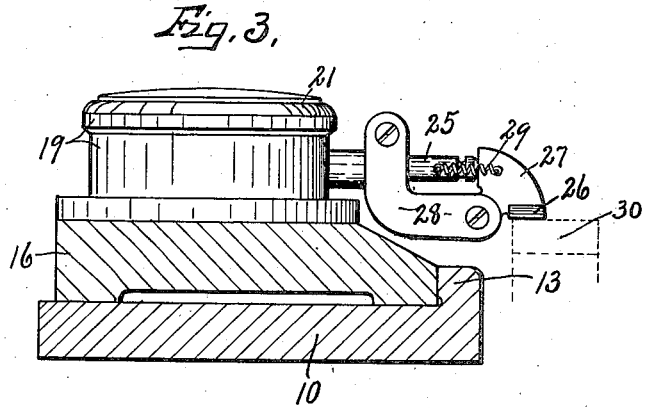
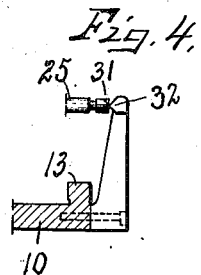
INVENTOR
C. J. Harter
BY
Howard P. Denison
ATTORNEY

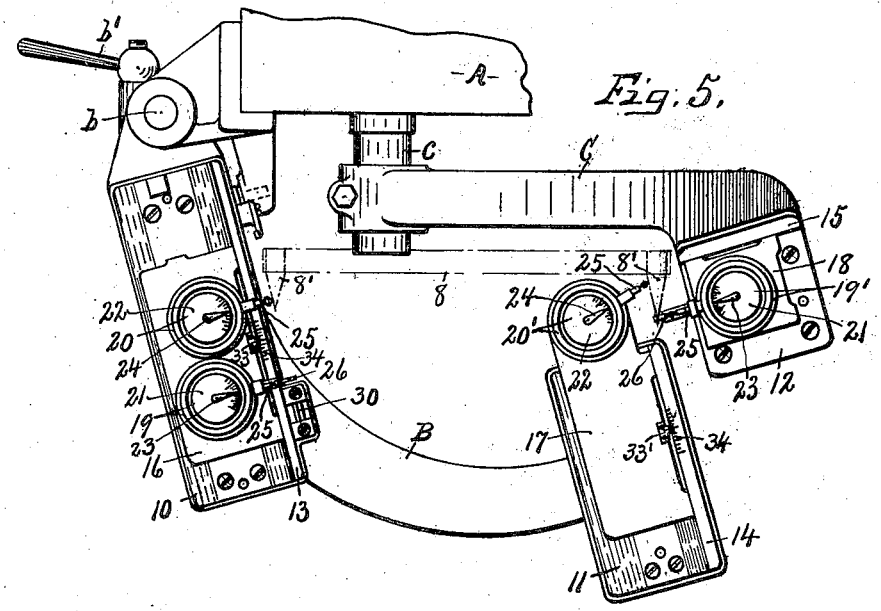

Patented Mar. 30, 1926.

1,579,108

UNITED STATES PATENT OFFICE.

CLARENCE J. HARTER, OF SYRACUSE, NEW YORK.

APPARATUS FOR TESTING THE ACCURACY OF GEAR-TEETH CUTTERS.

Application filed September 20, 1921. Serial No. 501,872.

*To all whom it may concern:*

Be it known that I, CLARENCE J. HARTER, a citizen of the United States, and resident of Syracuse, in the county of Onondaga, in the State of New York, have invented new and useful Improvements in an Apparatus for Testing the Accuracy of Gear-Teeth Cutters, of which the following, taken in connection with the accompanying drawings, is a full, clear, and exact description.

This invention relates to apparatus for testing the accuracy of the angles, contour and position of the cutting edges of gear teeth cutters, the object being to provide simple and efficient means for determining whether or not the teeth of the cutters are of uniform contour, angle and position relatively to the axis of rotation for cutting gear teeth of pre-determined formula.
One of the specific objects is to enable the outer cutting edge of one tooth and the inner cutting edge of another tooth, to be tested at one setting of the cutter.

Another object is to enable corresponding cutting edges of all of the teeth of the cutter to be tested at one setting of the testing instrument.

Other objects and uses relating to specific parts of the apparatus will be brought out in the following description. In the drawings:—

Figure 2 is a front elevation of the apparatus shown in Figure 1.

Figure 3 is an enlarged transverse vertical sectional view of a portion of the same apparatus taken on line —3—, Figure 1.

Figure 4 is an enlarged detailed sectional view taken on line 4—4, Figure 1.

Figure 5 is a top plan of a modified form of apparatus as applied to a gear cutting machine.

Figure 6 is a side elevation of the apparatus shown in Figure 1 detached from the machine.

Figure 1:
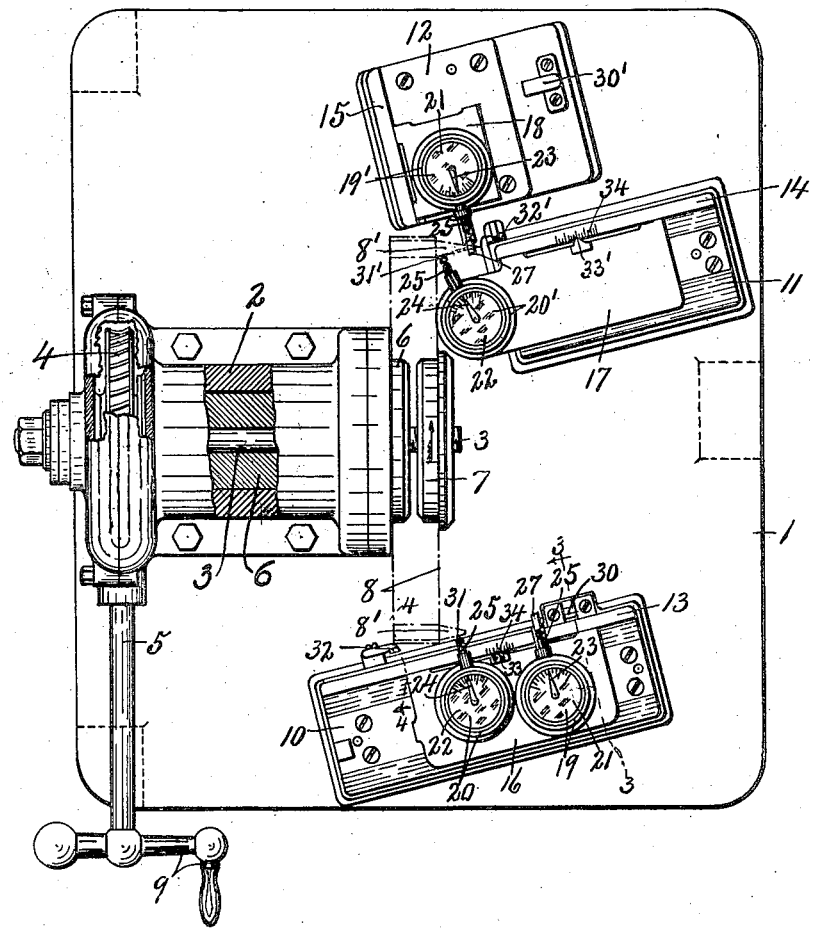
Figure 1 is a top plan partly in section of one form of apparatus for carrying out the objects stated, the cutter to be tested being shown by dotted lines.

The apparatus shown in Figs. 1 to 4 inclusive comprises a main supporting bed or base plate —1— upon which is mounted an upright housing —2— for receiving and supporting a mandrel —3—, a worm gear —4— and worm spindle —5—, the mandrel —3—
being journaled in suitable bearings in the opposite end walls of the housing —2— and extending beyond the inner end wall thereof for receiving and supporting a pair of collars —6— and —7— by which the cutter as —8—, shown by dotted lines in Fig. 1 may be clamped to the mandrel to rotate therewith.

The worm wear —4— is secured to the mandrel —3— and is engaged by a worm on the spindle —5— which is journaled in the housing —2— in a plane at right angles to that of the mandrel —3— and is provided with a hand crank —9— whereby it may be rotated to rotate the mandrel —3— as may be required to successively present the cutting teeth at each turn of the cutter —8— to the testing devices hereinafter described. Alternate teeth —8'— are provided with cutting edges at their inner and outer sides respectively, and are disposed in forwardly converging angles, known as the cutting angles for cutting the adjacent sides of gear teeth of given contour and angle according to certain formula commonly used as standard in gear cutting, but not necessary to herein illustrate or describe.

The testing devices are made and adjusted for testing the angles and contour of the cutting edges of the cutting teeth and also their position with reference to the axis of rotation of the cutter according to a master tooth or gage, which in turn, is made according to formula, said device comprising, in this instance three, surface plates —10—, —11— and —12— having substantially flat and smooth upper surfaces and raised lengthwise ribs —13—, —14— and —15— to form guides for a corresponding number of sliding plates or carriers —16—, —17— and —18—.

The flat upper faces of the plates —10—, —11— and —12— are disposed in parallel planes, or rather in planes parallel with the axis of the mandrel —3— and cutter —8— mounted thereon, the plate —10— and particularly its guide rib —13— being disposed at an angle to the axis of the arbor —3— and cutter —8— corresponding to the angle required for the outer cutting edges of the teeth —8'—, while the plate —11— and its guide rib —14— are disposed at an angle to the axis of the said arbor —3— and cutter —8— corresponding to the angle required for the inner cutting edges of the cutting teeth, the plate —12— and its guide rib —15— being disposed at right angles to the plate —11— and its guide rib —14—. That is, the plate —10— and its sliding member —16— are located at one side of the axis of the arbor —3— and cutter —8— for testing the cutting face and outer edge of the cutting teeth as they are successively presented to that side while the plates —11— and —12— and their corresponding plates or carriers —17— and —18— are located at the opposite side of said axis for testing the cutting face and inner cutting edges of the cutting teeth, as they are successively presented thereto, thereby permitting the cutting faces and cutting edges of two diametrically opposite teeth to be tested at one and the same setting of the cutter.

The movable carriers —16—, —17— and —18— are unattached to their respective plates —10—, —11— and —12— but rest loosely upon the flat upper faces thereof and are provided with straight edges movable along and against their respective ribs —13—, —14— and —15—, each carrier being removable and replaceable at will. A pair of dial indicators —19— and —20— such as the "B. C. Ames" dial indicator gages are permanently mounted upon the carrier —16— and are respectively provided with rotarily adjustable dials —21— and —22— and pointers —23— and —24— movable around their corresponding dials, which latter are provided with graduations extending in opposite directions from a zero position.

The carrier —18— is provided with an indicator —19'— similar to the indicator —19— while the carrier —17— is provided with an indicator —20'— similar to the indicator —20—, each indicator of the B. C. Ames type being provided with a movable plunger —25— and any suitable mechanism for transmitting motion from said plunger to the pointers of the corresponding indicators, which aside from their movable contact members for operating their respective plungers may be of any well known construction.

The indicators —19— and —19'— are provided with similar but reversely arranged contact members —26— mounted upon suitable bell crank levers —27—, which in turn are pivotally mounted upon relatively stationary supporting members —28—, and are held in contact with the outer ends of their respective plungers by springs —29—.

These contact levers —27— of the indicators —19— and —19'— are adapted to be set to engage respectively with the height gages —30— and —30'— which are fixed to their respective plates —10— and —12— at opposite sides and in approximately the horizontal plane of the mandrel —3— for determining the height or position at which the diametrically opposite teeth —8'— of the cutter are to be set for testing by simply moving the carriers —16— and —18— with the indicators thereon upon said plates from their respective height gages to their respective tooth locating positions.

In making the test of the several cutting teeth, the cutter is adjusted rotarily clockwise one tooth space at a time in the direction used for cutting the teeth of gears, and therefore, the cutting faces of the teeth adjacent the plate —10— face upwardly while those of the opposite side face downwardly and inasmuch as the upper surfaces of the plates —10—, —11— and —12— are disposed in parallel horizontal planes, it is desirable to bring the cutting faces of the teeth under test into similar parallel planes or as nearly as possible in the horizontal plane of the axis of the cutter, as determined by the height or horizontal plane of the height gages —30— and —30'—, the indicators and their supports being made to support the contact faces of their movable contacts at the same level as their respective gages —30— and —30'— and —32— and —32'—.

For example, in testing the angles and contours of the outer cutting edges of the cutter teeth 8', the plate —16— is moved along the plate —10— until the contact member —27— is brought into registration with the gage —30— and in contact therewith, whereupon the dial —21— will be set to cause its zero graduation to register with the pointer —23—, after which, the carrier —16— with the indicator —19— thereon is adjusted along the plate —10— and its guide rib 13 until the contact member —27— of the indicator —19— assumes a position directly over or in the path of the adjacent tooth —8'— at which time, the cutter —8— will be adjusted rotarily to bring the face of the adjacent cutting tooth against the contact member —27— until its pointer —23— registers with the zero graduation, thus indicating that the cutting tooth has been brought to the proper position for testing the cutting angle of its cutting edge in a manner presently described.

In testing the cutting angle and contour of the inner cutting edges of the teeth —8'—, the plate —18— is adjusted along and upon the upper surface of the plate —12— to bring its contact member —27— into engagement with the lower edge of the gage —30'— at which time, the dial of the indicator —19'— is adjusted rotarily to bring its zero point into registration with the corresponding pointer —23—, it being understood that the lower edge of the gage —30'— is disposed in a horizontal plane at which the inner cutting edge of the adjacent tooth —8'— is to be set for testing purposes.

When the dial of the indicator —19'— has been adjusted to bring its zero point into registration with the pointer —23—, the plate —18— with the indicator thereon is shifted along the plate —12— until one edge thereof is engaged with the rib —15— whereupon the contact member —27— will be brought into the path of and against the lower cutting edge of the adjacent tooth —8'— where if the teeth under test are correct the pointer assumes the zero position of the graduation on the dial, thus indicating that the lower cutting edge of the tooth —8'— is in proper position for testing the cutting angle and contour of its lower cutting edge as presently described.

The plungers —25— of the indicators —20— and —20'— are provided, respectively, with suitable contact members —31— and —31'— for testing the accuracy of the cutting angles and contours of the teeth —8'— after the latter have been brought to the desired testing position as previously described, and in order that these contact members may be set at the proper distance from the axis of the cutter, I have provided a pair of gages —32— and —32'— in fixed relation to their respective plates —10— and —11— with their contact faces parallel with the corresponding guide ribs —13— and —14— and in alinement with the outer and inner cutting edges respectively of the teeth.

In preparing the indicator —20— for testing the angle and contour of the outer cutting edges of the teeth and also the distance of said cutting edges from the center or axis of the cutter, the plate —16— is first adjusted along the plate —10— until the contact member —31— is brought into engagement with the contact face of the gage —32— at which time the dial —22— will be adjusted to bring its zero graduation into registration with the corresponding pointer —24—. The plate —16— is then returned to bring the contact member —31— into engagement with the outer cutting edge of the adjacent tooth —8'— and if by moving said plate —16— along the guide way —13—, the pointer —24— remains at the zero graduation of the dial —22— throughout the length of the tooth, it indicates that the cutting edge is of the correct angle and contour and distance from the center or axis of the cutter, while on the other hand, if the dial varies from its zero graduation, the degree of variation, plus or minus, will be indicated by the remaining graduations and thereby accurately determine the amount of correction required to bring the outer cutting edge of the tooth into proper angle and contour or distance from the axis of the cutter.

In a similar manner, the plate —17— may be moved along its guide rib —14— until the contact member —31— is brought into contact with the face of the gage —32'— and then the dial —25— is adjusted to bring its zero graduation into registration with the adjacent pointer —24—, thereby setting the indicator —25— for properly testing the angle, contour and distance from the axis of the inner cutting edge of the cutting tooth, such test being made by simply returning the plate —17— along the guide rib —14— until the contact member —31'— is brought into engagement with the inner cutting edge of the adjacent tooth, and if the pointer remains at the zero position of the dial, it indicates that the form and angle of the tooth and its distance from the axis of the cutter is correct but on the other hand, if there is any deviation of the pointer from the zero graduation, plus or minus, it indicates the exact amount of correction required to bring that cutting edge into proper contour and angle and distance from the axis of the cutter.

In a similar manner, each tooth of the cutter may be tested as it is successively brought to the testing position by the rotation of the cutter through the medium of the mandrel —3— and its operating means.

In order that each cutting edge of each tooth may be tested at some particular point in its length, as for example at the pitch circles, the plates —16— and —17— are provided, respectively, with pointers —33— and —33'—, each movable along a row of graduations —34— on the corresponding guide ribs —13— and —14— extending in opposite directions from a zero position.

When the pointers —33— and —33'— are registered with the zero graduation, the contact members —31— and —31'— will be in contact with the cutting edges of the corresponding teeth at their pitch circles so that by moving the plates —16— and —17— along their guide ribs —13— and —14— in reverse directions will cause the corresponding contact members —31— and —31'— to move along the adjacent cutting edges of the teeth and if any inaccuracy occurs as indicated by the pointer —24— of the indicators —20— and —20'—, the exact position of such inaccuracy may be determined by the pointers —33— and —33'— relatively to the pitch circle.

These testing devices may be used upon a base plate —1— which may be placed upon a bench, table or other suitable support to permit the cutting teeth to be tested at places remote from the gear cutting machine but as shown in Figs. 5 and 6, they may be mounted upon a gear cutting machine —A— for making the same test upon the teeth of the cutter in operative position in said machine in which case, the plates —10— and —11— would be mounted upon a suitable supporting arm —B— pivoted at —b— to the frame of the machine to swing horizontally and held in its adjusted position by a clamping nut or lever —b'— while the plate —12— would be mounted upon a separate arm —C— pivoted to a stud —c— on the main supporting frame for vertical adjustment, said adjustment permitting the clamping devices to be swung to and from their testing position so that the cutter may be placed and replaced upon the usual mandrel without detaching the supporting members —B— and —C— from the frame.

What I claim is:

1. In a device for testing the cutting angle of the cutting edges of gear cutters, a support for the cutter, a guide disposed at an angle to the axis of the cutter, a carrier movable along the guide, a contact member movable with said carrier and having an independent movement transversely of the guide for engaging one of the cutting edges of the cutting teeth as the carrier is moved along the guide, and means actuated by said contact member for indicating the amount of any irregularity or deviation of said cutting edge from the required contour and angle.

2. In a device for testing the cutting angle of the cutting edges of gear cutters, a support for the cutter, a guide disposed at an angle to the axis of the cutter, a carrier movable along the guide, a contact member movable with said carrier and having an independent movement transversely of the guide for engaging one of the cutting edges of the cutting teeth as the carrier is moved along the guide, a graduated dial mounted on the carrier, a pointer movable around the dial, and means for transmitting motion from the contact member to the pointer in case the cutting edge varies from the required angle or contour.

3. In a device for testing the cutting angle, contour and relative position of the teeth of gear cutters, the combination with means for supporting the cutter to rotate about its axis, of means for determining the position to which the cutting teeth are to be adjusted for testing, a guide parallel with one of the cutting edges of the teeth when brought to the testing position, a carrier movable along said guide, a contact member movable with the carrier along and against the cutting edge of the tooth under test and having an independent movement caused by any inaccuracy of said cutting edge, and means actuated by said independent movement of the contact member for indicating the amount of said inaccuracy.

4. In a device for testing the cutting angle and contour of the cutting edges of gear cutters, means for supporting said cutter to rotate about its axis, relatively stationary guides parallel with the cutting edges of diametrically opposite teeth under test when said teeth are brought to testing positions, means for bringing the teeth to their testing positions, separate carriers movable along their respective guides, contact members movable with their respective carriers along and against the cutting edges to be tested, and separate devices for indicating the amount of movement of the corresponding contact members due to any irregularity in the contour or required angle of said cutting edges.

5. In a device for testing the cutting angle of the cutting edges of gear cutters, means for supporting the cutter to rotate about its axis, means for setting the cutter to bring its teeth sequentially to a certain position for testing purposes, a relatively stationary guide parallel with one of the cutting edges to be tested when said teeth are brought to their testing positions, a stationary gage having a contact face in line with said guide, a contact member movable along the guide and having an independent movement transversely thereon, said contact member being movable into and out of engagement with the contact face of the gage, means for indicating the position of the contact member when engaged with said contact face, said contact member being movable along and against the cutting edge of the tooth under test to determine any irregularity of the angle or contour of said cutting edge.

6. In an apparatus for testing the cutting angle, contour and relative position of the cutting edges of gear cutters, means for supporting the cutter to rotate about its axis, a guide parallel with the cutting edge under test when said teeth are brought to their testing positions, a carrier movable along the guide, a stationary gage in the plane of said cutting edge, means movable with the carrier for determining the position of said cutting edge relatively to said plane, and means mounted on the carrier to move therewith and provided with a movable contact member and a pointer actuated thereby, said contact member being movable along and against the cutting edge under test for determining the accuracy or any irregularity in the form or angle of said cutting edge.

7. In an apparatus for testing the cutting angle, contour and relative position of the cutting edges of gear cutters, means for supporting the cutter to rotate about its axis, a guide parallel with the cutting edge under test when said teeth are brought to their testing positions, a carrier movable along the guide, a stationary gage in the plane of said cutting edge, means movable with the carrier for determining the position of said cutting edge relatively to said plane, and means mounted on the carrier to move therewith and provided with a movable contact member and a pointer actuated thereby, said contact member being movable along and against the cutting edge under test for determining the accuracy or any irregularity in the required form or angle of said cutting edge, and a stationary gage in a plane parallel with said guide and in line with the required angle of the cutting edge under test for engagement by the last named contact member whereby to determine the accuracy of contour and position of said cutting edge relatively to the axis of the cutter.

In witness whereof I have hereunto set my hand this 10th day of August 1921.

CLARENCE J. HARTER.